Sept. 25, 1956 — C. E. BRICKER — 2,764,263
BRAKE TORQUE LIMITER
Filed Aug. 26, 1952 — 2 Sheets-Sheet 1

INVENTOR.
CARL E. BRICKER
BY
R. L. Miller
ATTORNEY

Sept. 25, 1956   C. E. BRICKER   2,764,263
BRAKE TORQUE LIMITER
Filed Aug. 26, 1952   2 Sheets-Sheet 2
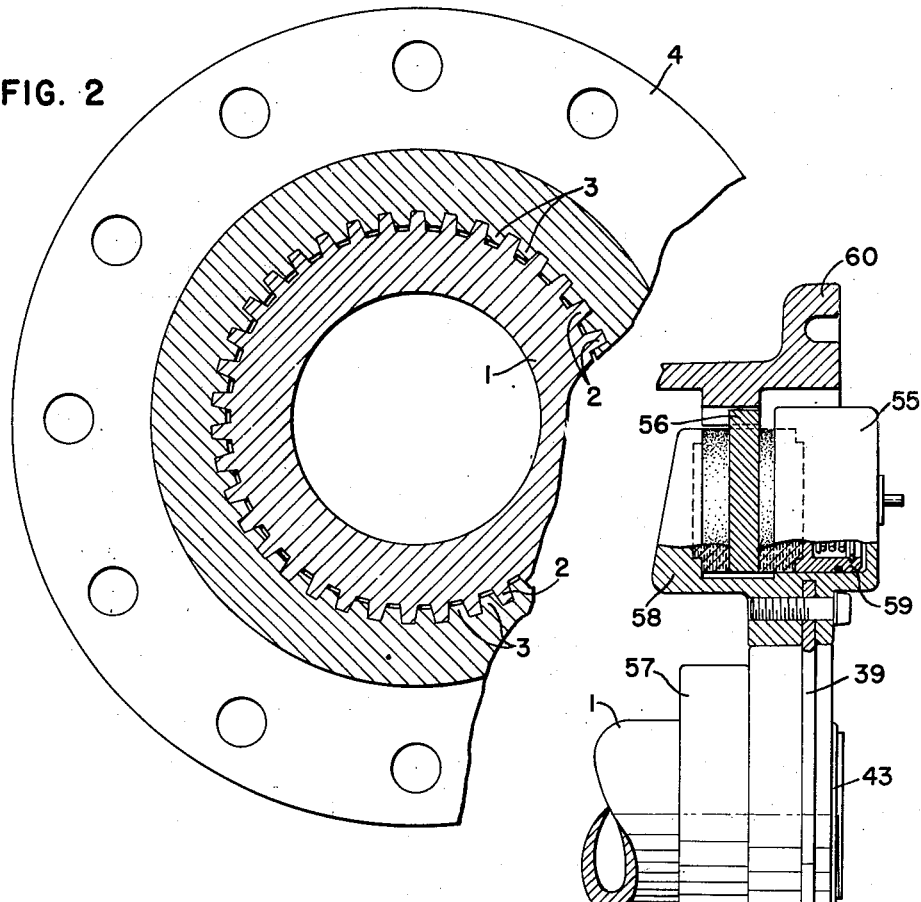
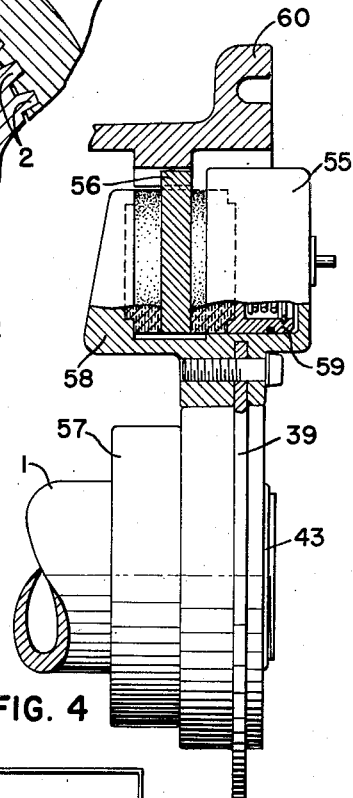
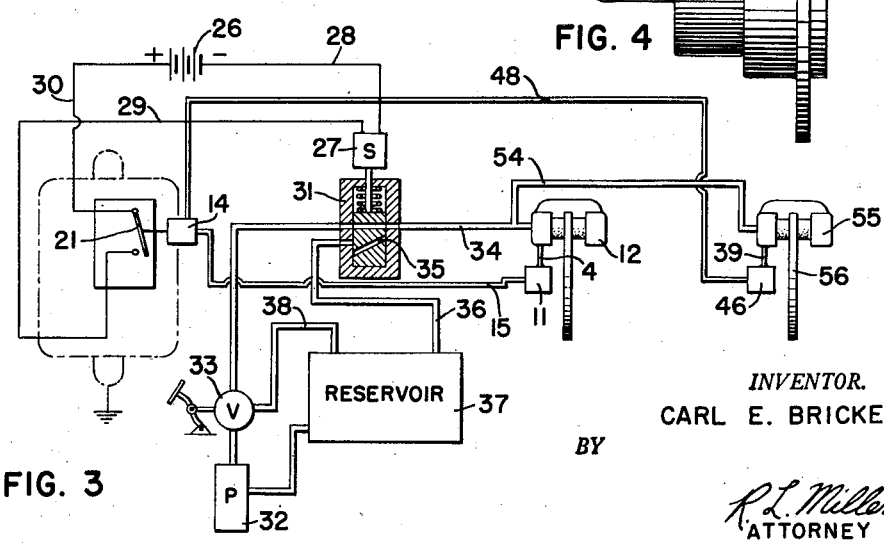
INVENTOR.
CARL E. BRICKER
BY
R. L. Miller
ATTORNEY United States Patent Office 2,764,263
Patented Sept. 25, 1956

2,764,263

BRAKE TORQUE LIMITER

Carl E. Bricker, Akron, Ohio, assignor, by mesne assignments, to The Goodyear Tire & Rubber Company, a corporation of Ohio Application August 26, 1952, Serial No. 306,376

2 Claims. (Cl. 188—152)

This invention relates to brakes, and particularly to a brake torque limiter especially adapted for use with airplane brakes or the like.

In brake actuation, it sometimes is possible to develop excessively high braking loads during a temporary actuation of the brake. These excessive braking stresses or torques may frequently arise in the brakes used on airplanes due to the large energy absorbing requirements involved in the stopping of a heavy airplane in a limited length of time. Such excessive braking stresses are undesirable in that it may cause wheel or tire failure or dangerous stresses in other portions of the aircraft support, such as the wheel supporting struts.

It therefore is the general object of the present invention to provide a novel type of brake construction which is particularly characterized by a brake torque limiter means provided in the braking apparatus.

Another object of the invention is to provide a relatively uncomplicated, sturdy type of hydraulic system which has a force developed therein proportionate to the braking forces and to utilize such proportionate force for terminating or reducing brake actuation, when excessive.

Another object of the invention is to provide a brake torque limiter that can be used in conjunction with a single disc brake or with a plurality of single disc brakes on a common axle, as desired.

The foregoing and other objects and advantages of the invention will be more apparent as the specification proceeds.

In the accompanying drawings and following specification, corresponding numerals are used to refer to corresponding parts, and one currently preferred embodiment of the invention is shown in the drawings, wherein:

Fig. 2 is a fragmentary vertical section taken on the line 2—2 of Fig. 1;

Fig. 3 is a diagrammatic representation of the brake apparatus of the invention and the electric control provided therefor; and Fig. 4 is a fragmentary elevation, partially broken away and shown in section, of brake means in combination with the brake support flange means of Fig. 1.

Figure 1:
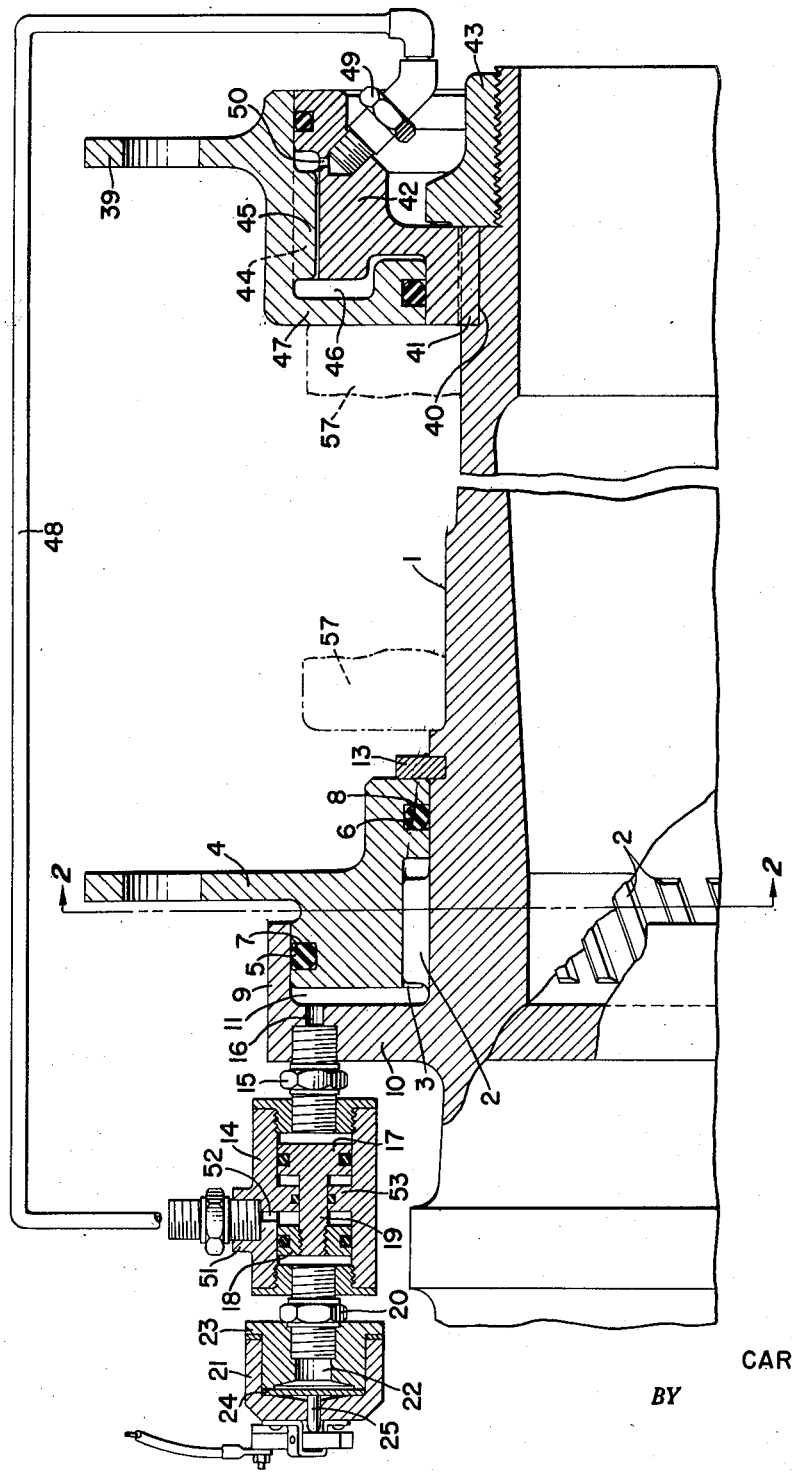
Fig. 1 is a fragmentary elevation, partially broken away, and showing in vertical section one type of brake construction embodying the principles of the invention.

The present invention relates to a brake wherein an axle is provided, a brake support flange is carried by the axle for limited rotation and axial movement thereon, means form a sealed hydraulic chamber between the brake support flange and the axle, and suitable brake means, carried on the brake support flange, are provided for exerting brake pressures on a brake disc to move the brake support flange axially to increase the pressure in the hydraulic chamber. A hydraulic cylinder is connected to the hydraulic chamber, and a pressure controlled switch connects to the hydraulic cylinder for closing when predetermined pressure exists in such cylinder. The switch connects to conventional means for controlling the brake actuation or reducing it when predetermined pressure exists in the hydraulic cylinder.

A suitable axle 1 is shown which has a plurality of cam-like splines 2 provided on one portion thereof, which splines are inclined to the axis of the axle. These splines 2 are provided to engage with complementary splines 3 provided on the radially inner portion of a brake support flange 4 and with the inclination of the splines being such that any limited rotation of the flange 4 on the axle results in axial movement of the flange 4 on the axle. The brake flange 4 is shown as carrying a pair of O-rings 5 and 6 in suitable channels or recesses 7 and 8, respectively, provided therein so that the O-rings 5 and 6 are tightly engaged with the periphery of the axle 1 and with an axially directed cup 9 provided on a rib 10 usually integrally formed with the axle 1. Thus, a hydraulic chamber 11 is provided between the adjacent surfaces of the cup 9 and rib 10, and the brake support flange 4.

Fig. 3 of the drawings shows that conventional brake means 12 are operatively associated with the brake support flange 4 and these brake means are of the type that move the brake support flange 4 slightly axially of the axle 1 toward the rib 10 on brake actuation. The extent of such axial movement of the brake support flange depends on the amount of wear which has occurred in the brake lining means used and the amount of relative rotation of the support flange on the axle 1. It will thus be realized that a pressure is set up in the hydraulic chamber 11 by axial movement of the support flange 4 on brake actuation which pressure is directly proportional to the braking torque forces applied to the brake support flange 4 so that measurement of such proportionate forces can be used to determine whether excessive braking forces are being generated in the braking means of the invention. A suitable lock ring 13 is shown engaged with the axle 1 to prevent undesired axial movement of the brake support flange 4.

So as to effect the desired control of the braking torque, a control cylinder 14 usually is provided and may be secured to the rib 10 by a suitable tubular fitting 15. This fitting 15 has a bore which connects to a bore 16 provided in the rib 10 and connecting to the hydraulic chamber 11. Hydraulic pressure is transmitted through the fitting 15 to the interior of the cylinder 14 with a conventional piston 17 being slidably received in the cylinder to have the pressure in the cylinder applied thereto. This piston 17 is provided with a head 18 adjacent the opposite end of the cylinder 14 from that with which the fitting 15 engages and connects thereto by a piston rod 19. A pressure transmitting fitting 20 is engaged with the opposite end of the cylinder 14 and it positions a pressure actuated electrical switch 21. The switch 21 includes a suitable hollow frame which has a hydraulic chamber 22 formed therein by an end cap member 23 that is suitably secured to the switch frame and with which end cap the fitting 20 engages. A pressure controlled diaphragm 24 is provided in the switch 21 and it has a contact finger 25 usually extending normally therefrom. This contact finger 25 can be moved along its axis to close the switch by deflection of the diaphragm 24 such as will occur when a desired predetermined pressure is exerted on such diaphragm by fluid in the chamber 22. Thus, the switch 21 will be closed only when a predetermined high pressure is existing in this switch chamber 22.

Fig. 3 shows how the brake application means can be controlled through the switch 21 and the control means is shown as including an electric circuit made from a suitable battery or other power source 26 with such battery being connected to a series circuit of a control solenoid 27 and the switch 21 by conventional leads 28, 29 and 30. The solenoid 27, for example, is adapted to control a two-position valve 31 with such valve normally being positioned for flow of hydraulic fluid from a suitably driven pump 32 through a brake pedal controlled valve 33 and conduit 34 to the conventional brake actuation means 12 illustrated, when the brake pedal is actuated. However, when the switch 21 is closed, the solenoid 27 will be energized to draw the valve 31 to a second position in which the fluid in the brake actuation means 12 will flow back through a bore 35 in the valve 31 to a return conduit 36 and to a fluid storage chamber 37. Hence excessive brake torque can be relieved and be prevented from more than instantaneous application to the brake means of the invention. The valve 33 connects conduit 38 to conduit 34 when the brake pedal is released to permit return flow of fluid to the storage chamber 37 and release of brake pressure. When the brake pressure falls below the predetermined maximum value thereof at which the diaphragm 24 is actuated, such diaphragm will automatically snap to a normally open setting for the switch 21 which in turn will deenergize the control solenoid 27 and again connect the brake means to the brake control valve 33 for braking action.

In the embodiment of the invention illustrated, a plurality of independent brake discs, brakes, and brake support means are shown upon the axle 1 and the apparatus described is for use in this type of a power brake system. A second brake support flange 39 is shown and it is positioned on the axle 1 in a manner similar to but axially spaced from the brake support flange 4. In this instance, axially directed splines 40 are provided in a recessed circumferential portion of the axle 1 and such splines engage complementary splines 41 formed on a positioning ring 42 used to mount the brake support flange 39 on the axle 1. A lock ring 43 is shown in threaded engagement with an end of the axle 1 to retain the positioning ring 42 thereon. Fig. 1 of the drawing shows that the positioning ring 42 is of substantially T-shape in section and has inclined splines 44, like the splines 2 and 3, but of opposite hand, on its outer periphery which engages with complementary splines 45 on an inner portion of the brake support flange 39.

Thus, a second hydraulic chamber 46 is provided intermediate the adjacent portions of the positioning ring 42 and the brake support flange 39 and operative in conjunction with brake support flange 39. The chamber 46 is partially formed by a cup-like extension flange 47 usually integral with the brake support flange 39 but offset therefrom and extending radially inwardly to engage the base of the positioning ring 42. Suitable packing means are engaged or positioned intermediate adjacent surfaces of the brake support flange 39 and the positioning ring 42 to seal the margins of the hydraulic chamber 46.

The pressure in the chamber 46 is likewise proportionate to the braking torque applied to the brake support flange 39. Fluid in the hydraulic chamber 46 is connected to a conduit 48 extending to the hydraulic cylinder 14 intermediate the ends thereof. The conduit 48 connects to a fitting 49 on the positioning ring 42 and a bore 50 in the positioning ring completes the fluid flow path to the chamber 46. The conduit 48 connects to a boss 51 on the cylinder 14, and a bore 52 is provided in the boss to connect to the bore of the cylinder 14. To prevent pressure reduction in the cylinder 14, it has a baffle 53 provided therein intermediate the piston 17 and the head 18 thereon with the piston rod 19 being slidably engaged with and extending through the baffle 53. Thus pressure transmitted to the cylinder 14 is integrated, or accumulated therein so that the total pressures existing in the chambers 11 and 46 are applied to the head 18. Accordingly, the apparatus of the invention functions to limit the total braking torque whether the brake support flanges 4 and 39 have equal or totally different braking forces applied thereto. In all events, the total braking forces applied to the axle 1 can be regulated to be maintained below the predetermined rating or setting of the pressure diaphragm 24 in the switch 21.

The brake fluid actuation conduit 34 has a branch conduit 54 leading to brake means 55 for the brake disc 56. Or, if desired, a separate control solenoid and valve may be provided to regulate the brake means 55 which may even have a separate control cylinder provided therefor.

Fig. 4 shows how the brake support flange 39 carries brake means 55 including a brake housing 58 which has a conventional spot-type hydraulically controlled piston 59 therein. The brake means 55 are adapted to engage opposite sides of the brake disc 56 splined to a wheel 60 for rotation therewith. The wheel 60 is journaled by bearings 57 on the axle 1. Thus braking forces applied to the brake disc 56 by the brake means 55 result in the application of a turning moment on the brake support flange 39.

The rotational direction of the wheel 60 in such with relation to the splines 2 and 3, and 44 and 45, that the brake support flanges are urged axially outwardly i. e., apart, as braking forces are applied to the brake discs. This creates the torque measuring and control pressures in chambers 11 and 46, as aforesaid, to control the operation of switch 21 and the relief of braking pressure if the total braking torque exceeds a safe limit.

The invention contemplates, in one form, that only a single brake disc and brake may be used in an assembly. In this case, the integrating cylinder 14 is omitted and the switch 21 is operated directly by the pressure in the hydraulic chamber 11, for example.

From the foregoing, it should be seen that a relatively inexpensive, simple but positive acting control has been provided by the invention so that the brake torque forces in a brake system with one or more brake units can be limited within desired values.

While a certain representative embodiment and details have been shown for the purpose of illustrating the invention, it will be apparent to those skilled in this art that various changes and modifications may be made therein without departing from the spirit or scope of the invention.

Having thus described my invention, what I claim is:

1. In combination, an axle, a wheel journalled on said axle, a pair of brake supports mounted on said axle for limited rotative and axial movement relative thereto, said axle and said supports having cooperating helical means engaging one another whereby said rotative movement of said supports result in said axial movement thereof, hydraulic chambers provided between said axle and said supports of variable volume as a result of such movement, brake means carried by said supports for braking said wheel resulting in torque providing axial movement of said supports, and unitary pressure actuated means connected to said chambers and responsive to pressure therein for reducing application of said brake means upon increase of pressure in said chambers by virtue of excessive torque.

2. In combination, an axle, a wheel journalled on the axle, a brake support mounted on the axle for limited rotative and axial movement relative thereto, cooperating helical means on the axle and support engaging one another whereby said rotational movement of said support results in said axial movement thereof, a hydraulic chamber provided between the axle and said support of variable volume as a result of such movement, brake means carried by said support for braking said wheel resulting in torque providing axial movement of said support, and pressure actuated means connected to said chamber and responsive to pressure therein for reducing application of said brake means upon increase of pressure in said chamber by virtue of excessive torque.

(References on following page)

References Cited in the file of this patent

UNITED STATES PATENTS

| | | |
|---|---|---|
| 1,496,953 | Stewart | June 10, 1924 |
| 1,823,225 | Wright | Sept. 15, 1931 |
| 1,961,207 | Dierfield | June 5, 1934 |
| 2,099,489 | Lambert | Nov. 16, 1937 |
| 2,181,717 | Wood et al. | Nov. 28, 1939 |
| 2,323,052 | Klaue | June 29, 1943 |
| 2,334,053 | Whitten | Nov. 9, 1943 |
| 2,385,168 | Stelzer | Sept. 18, 1945 |
| 2,471,320 | Gilson | May 24, 1949 |
| 2,656,017 | Trevaskis | Oct. 20, 1953 |